Feb. 18, 1958     G. H. CHAMBERLAIN     2,823,749
DEVICE FOR TRIMMING SHEET MATERIAL
Filed Aug. 23, 1954     2 Sheets-Sheet 1

INVENTOR.
GEORGE H. CHAMBERLAIN
BY
*Milburn & Milburn*
ATTORNEYS

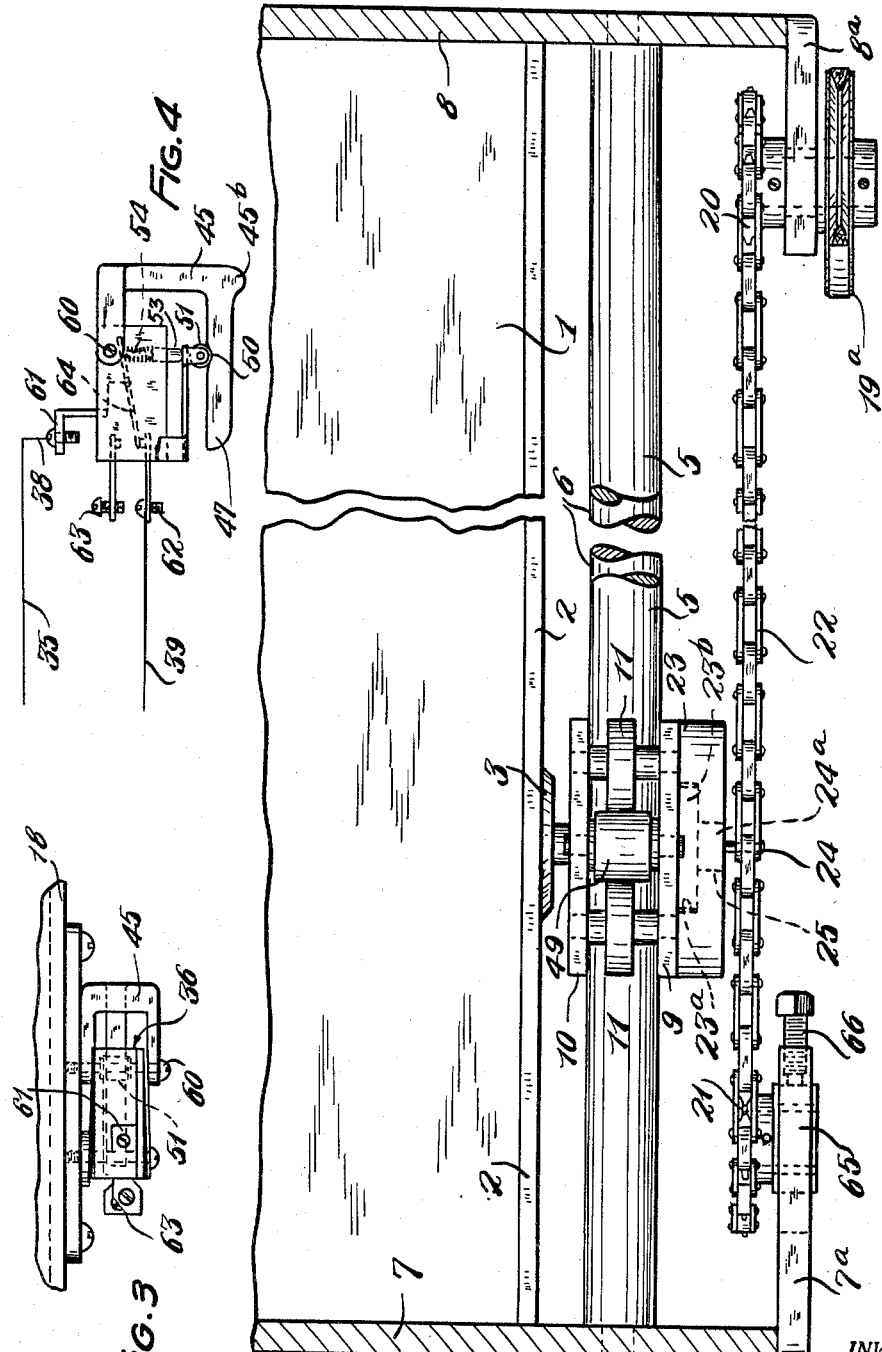

United States Patent Office 2,823,749
Patented Feb. 18, 1958

2,823,749

DEVICE FOR TRIMMING SHEET MATERIAL

George H. Chamberlain, San Jose, Calif.

Application August 23, 1954, Serial No. 451,620

8 Claims. (Cl. 164—76)

This invention relates to a device for trimming paper and other sheet material and is an improvement upon my copending application Serial No. 211,763, filed February 19, 1951 (now Patent No. 2,746,545), and also my Letters Patent No. 2,626,665, January 27, 1953, to which reference may be had for a fuller understanding of the general purpose and manner of operation of the present form of device.

In the present invention, as also in those above referred to, the cutting member has straight-line movement along the shearing edge of a board, as distinguished from the more familiar type of device in which a cutting blade is pivotally mounted at one corner of the board and is adapted to be lowered along the cutting edge thereof with a hinge-like movement. This old type of device has proved to be quite objectionable for various reasons as heretofore explained in the above-noted patent and patent application.

One object of my present invention is to devise a trimming board with motive means for effecting continuous reciprocating movement of the cutting element, for use with a smaller class of work that can be quickly positioned upon and removed from the board.

Another object is to devise such a trimming board in which the cutting element may be automatically stopped at the end of its straight-line path of movement, this arrangement being adapted for use in the trimming of a larger class of work that requires a longer time for positioning upon and removing from the trimming board.

Another object is to devise an organization in which the cutting element may be operated either continuously or intermittently according to choice as governed by the character of work that is to be trimmed at any given time.

Another object is to devise an electric switch that is adapted to be actuated by the carriage of the cutting element so as to effect the automatic stopping of the same at the end of each path of straight-line movement, together with means for resuming at will the movement of the cutting element in the opposite direction.

Another object is to devise an electric motive means for the cutting element with main and auxiliary electric circuits for effecting the continuous and intermittent operations of the cutting element, respectively, together with means for selectively including the auxiliary circuit with the main circuit so as to permit operation of the cutting element in either a continuous or intermittent manner at will.

Other objects will appear from the following description and claims when considered together with the accompanying drawings.

Fig. 2 is a top plan view thereof;

Fig. 3 is a top plan view of one of the single-pole single-throw switches; and

Fig. 4 is a view, corresponding to side elevation, of one of the single-pole single-throw switches which serve as limit switches and illustrates the complete structure of this unit of my present device.

Figure 1:
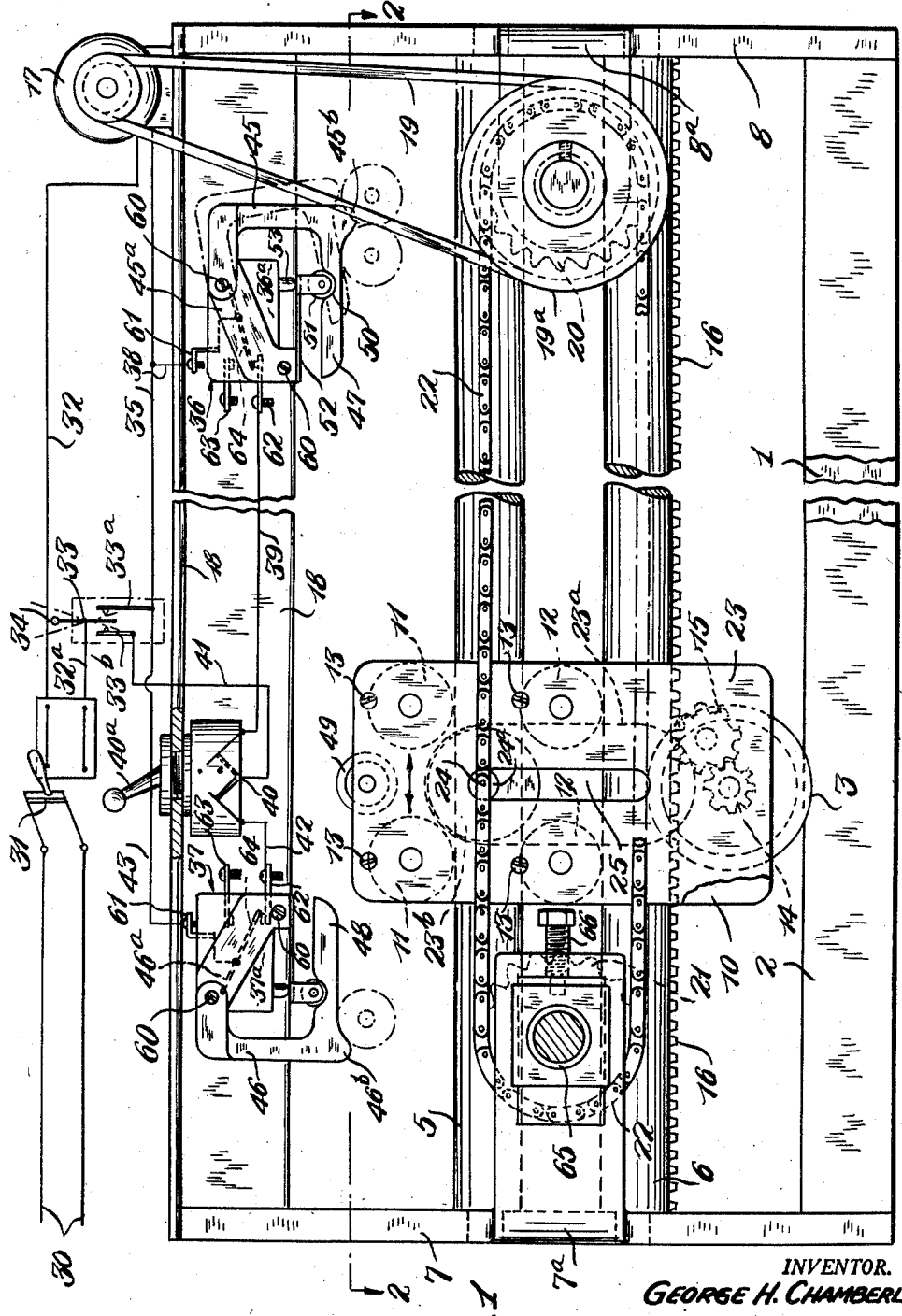
Fig. 1 is an elevation of my present device for trimming sheet material.

Referring now to the accompanying drawings in detail, the board 1 has the metal shearing blade 2 mounted upon one edge therefor for co-operation with the cutting disk 3 which is rotatably mounted upon the carriage therefor. This carriage is mounted upon the parallel horizontal rails 5 and 6 which are supported at their ends by the upright brackets 7 and 8 upon the board 1 and at the two ends of the shearing blade 2. The carriage has front and rear parallel plates 9 and 10 between which the upper and lower rollers 11 and 12, in pairs, are mounted for supporting the carriage on the rails, these plates being secured together by the screws 13. With this arrangement, the carriage is maintained in upright position. The rotatable cutting disk 3 has its shaft provided with a gear 14 fixedly mounted thereupon and in mesh with the pinion 15 which in turn meshes with the rack 16 along the under-side of the lower rail 6. Thus the straight-line movement of the carriage along the rails will effect rotation of the cutting element 3 in the same direction as that of the carriage movement.

In the present case the cutting disk 3 is adapted to be operated by an electric motor 17 that is mounted upon the top channel or angle bar support 18 on the upright brackets 7 and 8 and has belt drive connection 19 with a pulley 19a on the shaft of one of the sprockets 20 and 21 for driving the endless chain 22. The sprockets and pulleys are mounted upon inwardly extending bracket arms 7a and 8a; and the switches, referred to below, are also mounted upon the support 18. The carriage has affixed thereto a plate 23 provided with a vertically extending recess 23a to accommodate a disk 23b rotatably mounted therein; and the disk 23b has a horizontally extending pin 24 rotatably connected with chain 22 so as to be carried thereby. Pin 24 extends through and has a hub 24a in vertical sliding engagement within the vertical slot 25 that is provided in the plate 23 and that extends in a direction transversely of the chain 22, this slot extending entirely across the distance between the upper and lower parts of the chain. In this way, the pin 24 and spool 24a will follow the chain in its travel about the sprockets and will at the same time move along the slot 25 as the pin 24 and spool 24a make the turn about the sprocket. Thus the carriage may have uninterrupted movement back and forth so as to move the cutting element 3 back and forth along the shearing blade 2.

The continuous reciprocating movement of the cutting element is adapted for use in case of a plurality of small sheets that can be placed successively in trimming position upon the board and removed therefrom during the interval while the carriage and its cutting element are reversing their direction of movement in the manner just explained. This means a saving in time as it is not necessary to stop the operation of the device during the entire job of work.

However, there may be times when it is desirable to stop the carriage at the end of its path of straight-line movement in the case of sheets of a larger size which may require a longer time for removal of the sheet that has been trimmed and the proper positioning of the next sheet upon the board for trimming.

These two modes of operation may be accomplished in the present device by means of a main electric circuit and an auxiliary electric circuit for the electric motor 17, as will now be explained; that is, there may be exercised a selection as to the manner of operation desired for any particular job of work according to the size of the sheets to be trimmed.

The electric supply line 30 has the double-pole single-throw switch 31; one side of this line, as indicated at 32, goes to the electric motor 17 while the other side thereof has the single-pole double-throw switch 33 with the hand lever 34. When the switch 33 is in one position, the circuit will be closed through the switch arm 33a and the line 35 for continuous operation of the motor 17; and when the switch 33 is moved to its other position, the circuit will be closed through line 32a and the other switch arm 33b and the auxiliary line, to be now explained, for intermittent operation of the cutting element.

This auxiliary circuit has a single-pole single-throw switch 36 at one end of travel of the carriage and a duplicate single-pole single-throw switch 37 at the other end of the path of travel of the carriage so as to be automatically operated thereby, as will appear from the following. The one switch 36 is adapted to close the circuit between the line 38 from the line 35 and the line 39 which leads to the one side of the single-pole double-throw switch 40. The switch 40 has wire connection 41 to the switch arm 33b and thence to the main outside line 30 when switch 34 is closed through its arm 33b. The other side of the switch 40 has connection through the wire 42 to the one side of the switch 37 at the other end of the path of straight-line travel of the carriage, the other side of switch 37 being connected through 43 to the line 35 to the motor 17. The switch 40 may be changed from one position to the other by means of the hand lever 40a, as may be required in order to resume operation of the motor 17 after having been once discontinued, as will be now explained.

Rockably mounted upon the brackets 45a and 46a and the casings 36a and 37a of the switches 36 and 37, respectively, are the vertically disposed U-shaped lever arms 45 and 46, respectively, with the extended arm portions 47 and 48 that are so positioned that the idle roller 49 upon the carriage will pass therebeneath and therealong for operation thereof. At the corner of the U-shaped arms 45 and 46, in each case, there is a projection 45b or 46b for engagement by the roller 49 so as to cause the U-shaped lever to turn about its pivot, counter-clockwise at the right side of Fig. 1 in the present drawing. This will remove the recess 50 in the rockable arm 45 from detent engagement with the idle roller 51 on the free end of the resilient arm 52 that is mounted at its other end upon or may be an integral part of the bracket 45a on the switch housing 36a. The resilient arm 52 is adapted for engagement with the pin 53 which is urged normally by its spring 54 to open the switch. That is, when in full-line position (Fig. 1 of the drawings), the U-shaped arm 45 with its detent will hold the resilient arm 52 against the pin 53 so as to cause the same to force the switch to closed position against the spring 54. Then, with the circuit closed through the switch and hence through the motor 17, there will be travel of the carriage until its roller 51 rides along the lower long part 47 of the U-shaped arm and engages the projecting corner portion 45b and causes the U-shaped arm to turn about its pivot so as to release the detent and permit the switch to open. The circuit being thus broken through the motor 17, the travel of the carriage is at once discontinued.

Then, when the operator is ready for resumption of the carriage travel, he may manipulate the switch lever 40a so as to change the circuit to the automatic control switch 37 at the other end of the device. That is, the circuit is then changed from the line 39 to the line 42, thence through the closed switch 37 and through line 43 to the motor line 35, whereupon the motor 17 will resume operation and the cutter carriage will resume its movement so as to cause the cutter to pass along the shear blade in the opposite direction. It is of course understood that the other side of the switch 40 is connected through line 41 and the closed switch arm 33b to the line 32a. Then, when the roller of the carriage engages the projecting arm portion 46b of the U-shaped member at the left side of the device, as viewed in the present drawings (Fig. 1), the operation will be again automatically discontinued and the same procedure may be repeated as above described. It is to be noted that, after the roller has engaged the projecting corner portion 45b or 46b of the U-shaped arm in either case so as to open the circuit through the motor, the above-described resumed return movement of the carriage will cause the roller 49 of the carriage to engage the left-hand end of the lower part of the same U-shaped arm (in dotted lines in Fig. 1), and cause the same to be rocked counter-clockwise, as viewed herein, to its original full-line position so as to thereby close and hold closed the switch at this end of the device in proper position for operation when the two-way switch 40 is returned to its position corresponding to the closed position of the switch at the right-hand end of the device. Manipulation of switch 40 serves to selectively close the circuit through the switches 36 and 37 alternately. When the carriage starts on its return travel, it re-sets the switch at the end it is then leaving, as above pointed out, so that when the carriage is at any point between the limit switches 36 and 37, both of these limit switches are in closed position but electric current can pass through only the one that the carriage is approaching according to the position to which the selector switch 40 has been set by the operator. Thus the switches 36 and 37 at the two ends of the path of travel of the carriage may be referred to as limit switches while the hand-operated switch 40 may be referred to as a reversing switch.

As indicated in the present drawings, the rocking of the U-shaped arm 45 in a counter-clockwise direction, as seen herein, will cause the left-hand end of this arm to be moved to position within the path of the roller 49 upon its return travel in the manner above described; and thus the U-shaped arm 45 will be engaged and turned in opposite directions by engagement of the roller 49 as it is moved to the right and to the left, as viewed in the accompanying drawings.

The switch 36 or 37 in its casing 36a or 37a may be of a well-known present-day type and my bracket 45a or 46a with the rockable U-shaped arm 45 or 46 may be attached thereto so as to provide a self-contained assembly which is provided with conventional terminals or leads to the two sides of the switch for convenient connection of this unit in a desired installation. In the present case the bracket 45a or 46a is attached to the switch casing 36a or 37a by means of screws 60 although the bracket and casing may be formed integrally; and the U-shaped arms 45 and 46 have yoke portions which extend about the switch casings and are pivotally mounted upon the screws 60. This unitary assembly may be considered as an electric switch actuator. Also, in the particular form of this assembly, as herein illustrated, the pivot point 60 is directly above the center of the roller 51 so as to hold the U-shaped arm in a dependable position.

In the form of switch 36 or 37, as herein adopted, it has a common terminal connection 61 and the terminal connections 62 and 63 representing "on" and "off" positions of the switch. The pivotally mounted switch lever arm 64 has connection at its pivot point to the common line terminal 61 and the spring 54 tends to move the switch arm 64 to open position, that is, towards the terminal connection 63. Engagement of the arm 52 with the pin 53, in the manner above described, will cause the switch arm 64 to be moved to closed position at 62. With this form of switch, my device may be arranged so as to have the same urged normally to either "on" or "off" position according to the position of the switch lever spring and the wire connections to the terminals of the switch.

As indicated in the present drawings, the switches 36 and 37 are mounted upon the inside of the top channel or angle bar member 18; and the switch 40 is mounted beneath the top of the same support 18, as for instance by means of a screw-threaded connection.

At 65 I have indicated a conventional type of longitudinally adjustable bearing, with adjusting screw 66, for the chain sprocket 21 so as to be able to vary the tension of the chain 22 as may be necessary in order to meet the critical requirements of this part of my present invention.

It is to be understood that the present form of disclosure is merely for the purpose of illustration and that there might be devised various modifications thereof without departing from the spirit of my invention as herein set forth and claimed.

In addition to the several practical advantages above mentioned, it is thought that still further advantages of my present invention will be obvious to those who are familiar with the art to which it relates.

What I claim is:

1. A trimmer for sheet material comprising the combination with a board and shear strip thereon, of brackets mounted upon said board at the two ends of said shear strip, rail means mounted upon said brackets and extending parallel to the edge of said shear strip, a carriage slidably mounted upon said rail means for reciprocating movement therealong, a rotatable cutter mounted upon said carriage and having operative engagement with the cutting edge of said shear strip, and motive means for effecting continous reciprocating movement of said carriage along said rail means, means for automatically interrupting the movement of said carriage at the end of said straight-line path thereof, and means for selectively rendering said interrupting means operative or inoperative.

2. A trimmer for sheet material comprising the combination with a board and shear strip thereon, of brackets mounted upon said board at the two ends of said shear strip, rail means mounted upon said brackets and extending parallel to the edge of said shear strip, a carriage slidably mounted upon said rail means for reciprocating movement therealong, a rotatable cutter mounted upon said carriage and having operative engagement with the cutting edge of said shear strip, and motive means for effecting continuous reciprocating movement of said carriage along said rail means, means for automatically interrupting the movement of said carriage at the end of each straight-line path thereof together with manual control means for resuming movement of said carriage in the opposite direction, and means for selectively rendering said interrupting means operative or inoperative.

3. A trimmer for sheet material comprising the combination with a board and shear strip thereon, of brackets mounted upon said board at the two ends of said shear strip, rail means mounted upon said brackets and extending parallel to the edge of said shear strip, a carriage slidably mounted upon said rail means for reciprocating movement therealong, a rotatable cutter mounted upon said carriage and having operative engagement with the cutting edge of said shear strip, electric motive means for effecting continuous reciprocating movement of said carriage along said rail means, means for automatically interrupting the energization of said electric motive means at the end of each straight-line path of movement of said carriage, and means for rendering said interrupting means operative or inoperative so as to permit continuous or intermittent movement of said carriage at will.

4. A trimmer for sheet material comprising the combination with a board and shear strip thereon, of brackets mounted upon said board at the two ends of said shear strip, rail means mounted upon said brackets and extending parallel to the edge of said shear strip, a carriage slidably mounted upon said rail means for reciprocating movement therealong, a rotatable cutter mounted upon said carriage and having operative engagement with the cutting edge of said shear strip, electric motive means for effecting continuous reciprocating movement of said carriage along said rail means, means for automatically interrupting the electric circuit through said motive means at the end of each straight-line path of movement of said carriage together with a manual electric switch for reclosing the circuit through said motive means, and means for rendering said interrupting means operative or inoperative so as to permit continuous or intermittent reciprocating movement of said carriage at will.

5. A trimmer for sheet material comprising the combination with a board and shear strip thereon, of brackets mounted upon said board at the two ends of said shear strip, rail means mounted upon said brackets and extending parallel to the edge of said shear strip, a carriage slidably mounted upon said rail means for reciprocating movement therealong, a rotatable cutter mounted upon said carriage and having operative engagement with the cutting edge of said shear strip, electric motive means for effecting continuous reciprocating movement of said carriage along said rail means, electric switch means actuatable by said carriage for automatically interrupting the movement of the same at the end of each straight-line path of movement thereof, and manual electric switch means for rendering said interrupting means operative or inoperative so as to permit either continuous reciprocating or intermittent movement of said carriage at will.

6. A trimmer for sheet material comprising the combination with a board and shear strip thereon, of brackets mounted upon said board at the two ends of said shear strip, rail means mounted upon said brackets and extending parallel to the edge of said shear strip, a carriage slidably mounted upon said rail means for reciprocating movement therealong, a rotatable cutter mounted upon said carriage and having constant operative engagement with the cutting edge of said shear strip, a pair of sprockets, an endless chain engaged thereabout, electric motive means having drive connection with one of said sprockets for driving said chain, rotatable means of connection between said carriage and chain, said rotatable means having slidable engagement with said carriage in a direction transversely of said chain so as to permit said rotatable connection to follow the chain about the sprockets and thereby reverse the direction of movement of said carriage at the end of each path of straight-line movement thereof, the circuit of said electric motive means having an electric switch at each end of the straight-line path of movement of said carriage, each of said switches having a rockable trip means in the path of said carriage so as to effect opening and closing of each of said switches as said carriage moves thereapast in its reciprocating movement, a manually actuated switch for substituting one of said automatically operated switches for the other in the circuit of said electric motive means upon the automatic opening of said other switch so as to resume movement of said carriage, and a manual switch for rendering said automatic tripping switches operative or inoperative so as to permit continuous reciprocating or intermittent movement of said carriage at will.

7. In a device of the class described, a pair of sprockets, an endless chain engaged thereabout, electric motive means having drive connection with one of said sprockets for driving said chain, an actuating means having connection with said chain for movement therewith, said motive means having a main circuit and an auxiliary circuit for continuous and interrupted operations thereof, respectively, said auxiliary circuit having an electric terminal switch at each end of the straight-line path of movement of said actuating means, each of said terminal switches having a rockable trip means located in the path of said actuating means so as to be opened and closed, respectively, by movement of said actuating means in opposite directions, manual switch means for substituting one of said automatically operated switches for the other in said auxiliary circuit upon automatic opening of said other switch so as to resume movement of said actuating means, and a manual switch for selectively including said auxiliary circuit in or excluding the same from said main circuit so as to permit either continuous reciprocating movement or intermittent movement of said actuating means at will.

8. The same structure as recited in claim 7 hereof and in which said rockable trip means in each case has end projections adapted to be engaged alternately by said actuating means and moved thereby into and out of the path of movement of said actuating means for opening and closing said auxiliary circuit.

References Cited in the file of this patent

UNITED STATES PATENTS

| | | |
|---|---|---|
| 985,446 | Pease | Feb. 28, 1911 |
| 1,234,922 | Mattison | July 31, 1917 |
| 1,296,000 | Michael | Mar. 4, 1919 |
| 1,730,560 | Castricum et al. | Oct. 8, 1929 |
| 1,732,148 | Barrett | Oct. 15, 1929 |
| 1,920,591 | Pesci | Aug. 1, 1933 |
| 2,374,281 | Gheen | Apr. 24, 1945 |
| 2,551,811 | Mueller | May 8, 1951 |
| 2,626,665 | Chamberlain | Jan. 27, 1953 |
| 2,670,040 | Sayles | Feb. 23, 1954 |
| 2,711,617 | Trammell | June 28, 1955 |
| 2,713,904 | Ostuw et al. | July 26, 1955 |
| 2,727,571 | Sayles | Dec. 20, 1955 |